Aug. 20, 1946.  E. G. KING  2,406,298
CONTAINER CLOSURE
Filed June 30, 1944
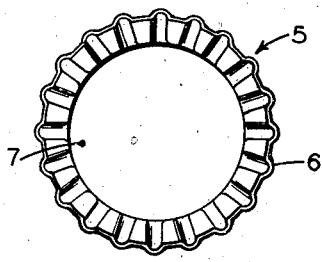
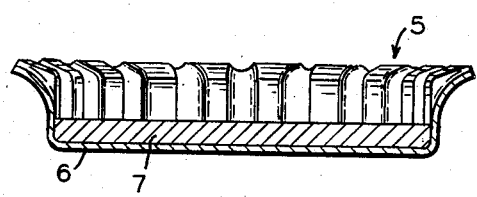
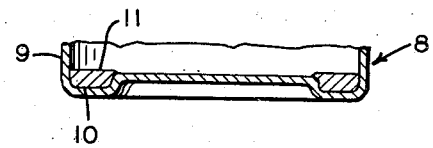

Patented Aug. 20, 1946

2,406,298

UNITED STATES PATENT OFFICE 2,406,298

CONTAINER CLOSURE

Ellis Gray King, Pittsburgh, Pa., assignor to Armstrong Cork Company, Lancaster, Pa., a corporation of Pennsylvania.

Application June 30, 1944, Serial No. 542,894

17 Claims. (Cl. 215—40)

This invention relates to container closures including sealing elements and is primarily concerned with a container closure including a sealing element formed of a relatively tough, flexible, cured alkyd resin consisting of the reaction product of a saturated aliphatic dibasic acid, propylene glycol, and an unsaturated aliphatic dibasic acid. The particular acids and the proportions thereof which may be used to achieve my new results are more fully hereinafter set forth for only certain acids in relatively limited proportions may be used.

Closures are used with a large variety of containers, such as bottles, jars, cans, pails, and the like. A sealing element or liner is required in substantially all types of container closures. These liners must be relatively tough, flexible, and resilient so that a tight seal is formed between the closure sealing element and the lip of the container and must be sufficiently devoid of cold flow so that the seal is maintained indefinitely. The liner should be impervious to gas even at elevated temperatures and pressures and must not impart an objectionable taste or odor to the food or beverages within the container. Further, the sealing element should be non-tacky so that portions thereof will not adhere to the container lip and be unsightly when the closure is removed and must be relatively insoluble and infusible so as to be substantially unaffected by a large variety of container contents.

Certain compositions have been proposed or used heretofore as materials suitable for use in container closures as sealing liners. For example, rubber and rubber compositions have been used, but rubber, and especially vulcanized rubber, tends to impart an objectionable odor and taste to the container contents. Alkyd resins which are the reaction product of a polyhydric alcohol and a polybasic acid have, in general, been found to have serious drawbacks which make them undesirable as sealing elements in closures. For example, alkyd resins of the saturated dibasic acid-polyhydric alcohol type cure by condensation, yielding water which tends to produce a porous structure which will not form a gas-tight seal. Further, these resins require extended periods at high temperatures to effect curing and, what is most important, these resins are too viscous to be poured readily into a closure for forming therein a sealing element. Reducing the reaction time so as to produce less viscous resins does not solve the problem for such less viscous resins require even a longer time for curing and produce even more water during condensation. Many of the other alkyd resins cannot be readily cured. While many of those alkyd resins modified with a drying oil do cure to a tack-free condition, the drying oil tends to impart taste and odor to the contents of the container, especially if there is a small amount of oil present that has become rancid.

It is an object of this invention to provide a new and improved closure comprising a closure shell and a sealing element formed of an alkyd resin and especially to provide an alkyd resin which can be readily flowed into a closure and relatively quickly cured to an insoluble, infusible, and tack-free condition at a relatively low temperature.

I have discovered an improved container closure comprising a shell of any desired configuration and a sealing element of a flexible, resilient, tough, and tack-free, substantially insoluble and infusible alkyd resin which is particularly acceptable as a closure lining material. This alkyd resin consists of the reaction product of from 146 to 365 grams of a saturated, aliphatic dibasic acid containing 4 to 10 carbon atoms; one gram molecular weight of an unsaturated, aliphatic dibasic acid containing 4 to 5 carbon atoms and in which the carbonyl groups are attached to two different carbon atoms and in which the carbon to carbon double bond is conjugated with at least one of the carbonyl double bonds; and propylene glycol in an amount sufficient to condense with said acids and form a condensation product having an average molecular weight of at least 1,000. This condensed alkyd resin has the important advantage in that it can be readily poured into a closure shell and relatively easily cured to form a highly satisfactory sealing element. The fact that the resin can be poured into the closure shell and cured is highly desirable in that the preforming and insertion problems are eliminated. For example, a large stock of preformed sealing elements need not be carried in stock and an adhesive need not be used for adhering the preformed element within the closure shell. Further, the necessity for the relatively complicated and expensive machinery normally used for inserting preformed sealing elements is eliminated.

These and other advantages and objects will become more apparent when considering the following detailed description and the accompanying drawing, in which:

Figure 1 is a sectional view of a crown type closure embodying my invention;

Figure 2 is a plan view of the closure of Figure 1; and,

Figure 3 is a sectional view of another closure also embodying my invention.

Referring more particularly to Figures 1 and 2, a crown closure 5 comprises a shell 6 and a sealing element 7. The sealing element 7 is shown in the form of a disk but may be in the form of an annular ring as shown in Figure 3. When the closure 5 is placed on a container, such as a bottle, the sealing element 7 engages a lip to form a seal.

Figure 3 shows a different type of closure 8 comprising a shell 9 having an annular groove 10 formed therein. The groove 10 contains an annular sealing ring 11.

My new closures are not limited to any particular shape or design of either the closure shell or the sealing member though I am primarily concerned with the well-known crown-type closure such as is shown in Figure 1.

My new closures comprise a sealing element formed of an alkyd resin. The alkyd resin must be prepared from a mixture comprising a saturated aliphatic dibasic acid, propylene glycol, and an unsaturated aliphatic dibasic acid.

The saturated aliphatic dibasic acid containing 4 to 10 carbon atoms may be, for example, succinic acid, adipic acid, sebacic acid, or the like. While alkyd resins can be prepared from other saturated aliphatic acids and other polybasic acids, such other acids are not included within the present invention for they are unsatisfactory.

The unsaturated dibasic acid may be any unsaturated aliphatic dibasic acid containing 4 to 5 carbon atoms in which the carbonyl groups are attached to two different carbon atoms and in which the carbon to carbon double bond is conjugated with at least one of the carbonyl groups. For example, maleic acid or anhydride, fumaric acid, itaconic acid, citraconic acid, and the like, or mixtures thereof, may be used, though we prefer maleic acid, maleic anhydride, and fumaric acid. Malic acid which yields fumaric acid, maleic anhydride, and water upon being heated to the reaction temperature can be used, for it is the products, fumaric acid and maleic anhydride, which react. Fumaric acid at the temperatures of the reaction forms maleic anhydride and is, therefore, a full equivalent of maleic acid. It is well recognized that anhydrides of such dibasic acids are the full equivalents of the acids.

To further illustrate the definition of the unsaturated aliphatic dibasic acid, maleic acid has the formula, $$O=C-C=C-C=O$$
$$\phantom{O=C}|\phantom{-}|\phantom{-}|\phantom{-C=}|$$
$$\phantom{O=C}OH\phantom{-}H\phantom{-}H\phantom{-}OH$$

and contains two carbonyl groups,

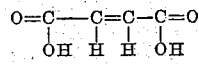

These carbonyl groups are connected to two different carbon atoms. While in maleic acid the carbon to carbon double bond is conjugated with each of the carbonyl double bonds, it is only necessary for the carbon to carbon double bond to be conjugated with one of the carbonyl groups, as in itaconic acid where the formula is written as

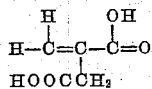

As long as the grouping

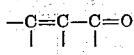

is present, the unsaturated aliphatic acid comes within the term "conjugated."

The ratio of saturated dibasic acid to unsaturated dibasic acid is relatively critical. I have discovered that for each gram molecular weight of unsaturated dibasic acid, I may employ from 146 to 365 grams of the saturated dibasic acid. When the unsaturated dibasic acid is maleic acid, fumaric acid, or maleic anhydride, I prefer to employ from 219 to 292 grams of saturated dibasic acid. Thus, I may react from 1.0 to 2.5 mols of adipic acid with one mol of maleic acid, fumaric acid, or maleic anhydride, though I prefer to react from 1.5 to 2.0 mols of adipic acid with each mol of maleic acid, fumaric acid, or maleic anhydride. It has been discovered, for example, that if the same number of mols of succinic acid are used as specified for adipic acid, the resultant resin is too hard to form a satisfactory closure sealing element, but if succinic acid or any of the other saturated dibasic acids are substituted in an amount equal to the weight of adipic acid specified, then suitable resins are produced.

While any of the aforementioned acids may be used, I prefer to employ adipic acid as the saturated dibasic acid and either maleic acid, fumaric acid, or maleic anhydride as the unsaturated dibasic acid.

If a greater amount of the saturated dibasic acid relative to the amount of unsaturated dibasic acid is employed, the alkyd resin may not cure, or if it does, it is relatively soft and tends to crack under pressure and may be tacky. If a smaller amount of saturated dibasic acid relative to the amount of unsaturated dibasic acid is used, the resin is too hard and does not compress sufficiently to form a satisfactory sealing element. I especially prefer to employ from 1.5 mol to 2.0 mols of adipic acid for each mol of maleic acid for it has been found that the resultant resin is especially useful for crown type closures where the sealing element must retain relatively high carbonation pressures.

With the above-mentioned proportions of acids, it is only intended to include propylene glycol as the polyhydric alcohol. While I prefer to employ the propylene glycol in a molal amount equal to the total molal amount of both acids, there may be present an excess amount of the acids in the above-mentioned ratios or there may be present an excess amount of the glycol so long as the excess acids or glycol are not present in an amount sufficient to prevent the formation by condensation of a soluble, fusible resin having an average molecular weight of at least 1,000. When there are present in the reaction mixture exactly equal molal amounts of glycol and acid, each condensation polymer on the average has one terminal hydroxyl group and one terminal carboxyl group, whereas, if there is an excess amount of either acid or glycol, the polymers cannot condense without loss of the constituent in excess beyond that point where all terminal groups are the same, that is, where all terminal groups are either hydroxyl groups or carboxyl groups.

The sealing element of relatively infusible and insoluble cured alkyd resin is produced as the result of two different types of chemical reactions. The first reaction comprises an esterification or condensation reaction in which the acids and the alcohol combine with the elimination of water to form a fluid resin of relatively low viscosity. In the second reaction, there is effected a cross-linking of the polymers formed by condensation through the double bonds of the unsaturated acid present in such polymers to produce a relatively infusible and insoluble cured alkyd resin consisting of relatively large complex polymers. I prefer to cure the alkyd resin in an inert atmosphere, such as carbon dioxide, nitrogen, or the like, with the aid of an organic peroxide catalyst, such as benzoyl peroxide, though the resin may be cured to a tack-free condition in any other satisfactory manner.

The benzoyl peroxide is a solid and may be added to the resin in any known manner, though I prefer to dissolve it in styrene and then add this solution to the condensed resin to aid in curing the resin. The use of styrene is advantageous in that it increases the fluidity of the resin without causing bubbles in the resin during curing. I have used up to 30 parts of styrene to 100 parts of resin, though only about 10 parts by weight of the styrene polymerized, the remainder being evaporated during curing. The styrene tends to increase the toughness of the resin and, therefore, a slightly smaller amount of unsaturated acid may be used. Alternatively, the benzoyl peroxide may be dissolved in benzene and added to the condensed resin and the benzene then evaporated or the benzoyl peroxide may be added in solid form on a carrier such as calcium sulphate.

I prefer to form the sealing element within the closure by pouring the relatively fluid resin resulting from the first condensation reaction into the closure seal and then curing the alkyd resin. If desirable, the alkyd resin ingredients may be esterified, cured by molding in the form of sheets and then annular rings or disks may be die cut therefrom and such a preformed sealing element inserted into the closure.

The following examples are intended to further illustrate my invention without limiting it to the exact proportions or ingredients set forth except as defined by the appended claims.

*Example 1*

Closures were prepared as follows:

| | Grams |
|---|---|
| Maleic anhydride | 49.0 |
| Adipic acid | 182.6 |
| Propylene glycol | 133.4 |

These ingredients were mixed and heated gradually to 200° C. in one hour and the water evolved was removed by a condenser. A conventional trap was then installed, 25 cc. of xylene was added, and the heating continued for 1½ hours, the water formed during the condensation being removed by azeotropic distillation. The trap was then removed and a vacuum of about 12 mm. of mercury applied and the heating continued at about 200° C. for 2 hours and 50 minutes. During the entire process, a small stream of nitrogen was passed through the apparatus so that the resin was condensed under an inert atmosphere. The acid number of the cooled resin was 37.8 and its molecular weight was about 1500. This resin was compounded as follows:

| | | |
|---|---|---|
| The above resin | grams | 25 |
| Red slate | do | 16.7 |
| Styrene including 10% of benzoyl peroxide | cc | 1.46 |

These materials were mixed and molded at 257° F. for 40 minutes. The resultant sheet was non-tacky and resilient. Annular rings were cut from this sheet and placed within closure shells to form therein a satisfactory sealing element. These rings were softer than preferred.

In this example, the amount of the ingredients are equivalent to 2.5 mols of adipic acid, one mol of maleic anhydride, and 3.5 mols of propylene glycol.

*Example 2*

Closures were prepared as follows:

| | Grams |
|---|---|
| Maleic acid | 294 |
| Adipic acid | 876.6 |
| Hydroquinone | 0.2 |

The ingredients were mixed and heated slowly to 200° C. in 4½ hours. A conventional trap was installed and 30 cc. of xylene was added and the heating continued for 2.1 hours, the water formed during the reaction being removed by azeotropic distillation. A vacuum of 27 mm. of mercury was applied and the heating continued at 200° C. for 4 hours. The resin had an acid number of 32.4 and a molecular weight of about 1730.

Closures were prepared from this resin as follows:

| | Grams |
|---|---|
| The above resin | 20 |
| Iron oxide | 20 |
| Benzoyl peroxide | 0.1 |
| Styrene | 0.9 |

The benzoyl peroxide was dissolved in the styrene and thoroughly mixed with the other ingredients. The mixture was poured into crown shells and cured under $CO_2$ gas. These crowns were applied to bottles containing 4.5 volumes of dissolved $CO_2$ gas and retained carbination after one week at 120° F.

A like mixture was readily cured under $CO_2$ gas in the form of a sheet ⅛" thick and another cured in a closed mold. Sealing elements in either the form of disks or annular rings can be cut from the sheet and then placed within closure shells to produce highly satisfactory closures.

*Example 3*

A condensed alkyd resin was prepared as described in Example 2 and then compounded as follows:

| | Parts |
|---|---|
| Resin | 100 |
| Red slate power | 66.7 |
| Benzoyl peroxide | 0.5 |
| Styrene | 4.5 |

This mixture was poured into a crown closure and cured under $CO_2$ gas. The crowns retained carbonation even at pasteurization temperatures of 150° F. followed by storage for one week at 120° F. These crowns were tested on containers containing 4.5 volumes of dissolved $CO_2$ gas.

*Example 4*

An alkyd resin was prepared as described in Example 2 and then compounded as follows:

| | Parts |
|---|---|
| Resin | 50 |
| Filler | 50 |
| Benzene | 1 |
| Benzoyl peroxide | 0.25 |

Four different mixtures were compounded in the above proportions using different fillers. The fillers were calcium carbonate, "Gartex" which is finely divided 85% silica and 15% glass, potter's flint, and iron oxide. All of these compositions after being poured into closure shells and cured retained carbonation of from 4 to 4.6 volumes after one week at 120° F.

Example 5

Closures were prepared as follows:

| | Parts |
|---|---|
| Maleic anhydride | 68.6 |
| Adipic acid | 102.3 |
| Propylene glycol | 109.5 |
| Hydroquinone | 0.2 |

The ingredients were mixed and heated gradually to 200° C. and then heated for an additional period of 35 minutes, the water evolved being removed by azeotropic distillation. The resinous mixture was then heated under vacuum for 4 hours and 25 minutes at 200° to 220° C. The resin had an acid number of 34.2 and a molecular weight of about 1640.

Satisfactory sealing elements can be readily formed from this resin or from mixtures of this resin and filler by any of the methods previously described in the examples.

Example 6

An alkyd resin was prepared as follows:

| | Parts |
|---|---|
| Fumaric acid | 69.7 |
| Adipic acid | 175.3 |
| Propylene glycol | 140 |

The ingredients were mixed and heated to 200° C. in 30 minutes. Xylene was added and the heating continued, the water evolved being removed by azeotropic distillation. Vacuum was applied and the heating continued until 6 hours had elapsed. The resin had an acid number of 35.4. This resin may be used to form highly satisfactory sealing elements either by itself or when compounded as previously described.

Example 7

Closures were prepared as follows:

| | Parts |
|---|---|
| Maleic anhydride | 137.2 |
| Succinic acid | 330.4 |
| Propylene glycol | 329.2 |

The ingredients were mixed and heated to 200° C. for 2½ hours. Xylene was added and the heating continued until 6.6 hours had elapsed, the water evolved being removed by azeotropic distillation. The resin had an acid number of 40.4 and a molecular weight of about 1400.

This resin was compounded as follows:

| | Parts |
|---|---|
| The above resin | 100 |
| Styrene | 4.5 |
| Benzoyl peroxide | 0.5 |

The benzoyl peroxide was dissolved in the styrene and the ingredients mixed and then poured into a crown type closure and cured. A tough film which held carbonation during pasteurization and storage was formed.

Example 8

Closures were prepared as follows:

| | Grams |
|---|---|
| Adipic acid | 116.8 |
| Itaconic acid | 52.1 |
| Propylene glycol | 91.3 |
| Propylene glycol (1% excess) | 0.9 |

In this example, there are two mols of adipic acid for one mol of itaconic acid.

The reactants were placed in a 3-neck flask fitted with a stirrer, thermometer, and Widmer column. The temperature was raised gradually over a period of one hour to a temperature of 200° C., carbon dioxide being passed through the apparatus. After a further 45 minutes, a trap containing calcium chloride and calcium carbide was attached and sufficient xylene added to the reaction mixture so that there would be a continuous reflux through the trap. After 5 hours and 25 minutes at about 200° C., the trap was removed and carbon dioxide was blown through the resin for 30 minutes to remove the xylene. The acid number was 22.1 and the molecular weight was about 2500.

This resin was mixed and cured as follows:

| | Grams |
|---|---|
| Resin | 21.7 |
| Red slate | 3.75 |
| Luperco A (25% benzoyl peroxide or calcium sulphate) | 0.87 |
| Styrene | 1.09 |

This mixture was poured into crown shells and cured in an atmosphere of carbon dioxide for 35 minutes at 125° C. The crown closures were applied to bottles containing 4.5 volumes of dissolved $CO_2$ gas and carbonation was retained for one week at 120° F.

Example 9

An alkyd resin may be prepared from the following ingredients:

| | Grams |
|---|---|
| Sebacic acid | 150 |
| Maleic anhydride | 98 |
| Proplene glycol (slight excess) | 135 |

These constituents were reacted as described under Example 9 except that after 3 hours and 57 minutes, the acid number was 41.3 and after 5 hours was 23.9. This heavy resin may be compounded and used in closures as described in any of the preceding examples.

The particular alkyd resins which I have described may be used with or without fillers, though I prefer to employ fillers as they reduce the cost of the sealing elements. Any filler, such as, for example, calcium carbonate, slate, iron oxide, tripoli, potter's flint, and the like or mixtures thereof, may be used in widely varying proportions.

Having described my invention in detail, it is obvious that some features may be employed without others, all without departing from the sprit or scope of my invention defined in the accompanying claims:

I claim:

1. A closure comprising a shell and a sealing element including a cured alkyd resin consisting of the cured condensation reaction product of from 146 to 365 grams of a saturated, aliphatic dibasic acid containing 4 to 10 carbon atoms; one gram molecular weight of an unsaturated, aliphatic dibasic acid containing from 4 to 5 carbon atoms and in which the two carbonyl groups are connected to two different carbon atoms and in which the carbon to carbon double bond is conjugated with at least one of the carbonyl double bonds; and propylene glycol in an amount sufficient to condense with said acids and form a resinous condensation product having an average molecular weight of at least 1,000.

2. A closure comprising a shell and a sealing element including a cured alkyd resin consisting of the cured condensation reaction product of from 219 to 292 grams of a saturated, aliphatic dibasic acid containing 4 to 10 carbon atoms; one gram molecular weight of a material selected from the group consisting of maleic acid, fumaric acid, and maleic anhydride; and propylene glycol in an amount sufficient to condense with said acids and form a resinous condensation product having an average molecular weight of at least 1,000.

3. A closure comprising a shell and a sealing element including a cured alkyd resin consisting of the cured condensation reaction product of from 146 to 365 grams of a saturated, aliphatic dibasic acid containing 4 to 10 carbon atoms; one gram molecular weight of an unsaturated, aliphatic dibasic acid containing from 4 to 5 carbon atoms and in which the two carbonyl groups are connected to two different carbon atoms and in which the carbon to carbon double bond is conjugated with at least one of the carbonyl double bonds; and propylene glycol in a molal amount substantially equal to the total amount of both said saturated and said unsaturated acids.

4. A closure comprising a shell and a sealing element including a cured alkyd resin consisting of the cured condensation reaction product of from 219 to 292 grams of a saturated, aliphatic dibasic acid containing 4 to 10 carbon atoms; one gram molecular weight of unsaturated acid selected from the group consisting of maleic acid, fumaric acid, and maleic anhydride; and propylene glycol in a molal amount substantially equal to the molal amount of both said saturated and said unsaturated acids.

5. A closure comprising a shell and a sealing element including a cured alkyd resin consisting of the cured condensation reaction product of from 1.0 to 2.5 mols of adipic acid; one mol of an unsaturated, aliphatic dibasic acid containing from 4 to 5 carbon atoms and in which the two carbonyl groups are connected to two different carbon atoms and in which the carbon to carbon double bond is conjugated with at least one of the carbonyl double bonds; and propylene glycol in an amount sufficient to condense with said acids and form a resinous condensation product having an average molecular weight of at least 1,000.

6. A closure comprising a shell and a sealing element including a cured alkyd resin consisting of the cured condensation reaction product of from 1.5 to 2.0 mols of adipic acid; one mol of an unsaturated, aliphatic dibasic acid containing from 4 to 5 carbon atoms and in which the two carbonyl groups are connected to two different carbon atoms and in which the single carbon to carbon double bond is conjugated with at least one of the carbonyl double bonds; and propylene glycol in an amount sufficient to condense with said acids and form a resinous condensation product having an average molecular weight of at least 1,000.

7. A closure comprising a shell and a sealing element including a cured alkyd resin consisting of the cured condensation reaction product of from 1.0 to 2.5 mols of adipic acid; one mol of an unsaturated, aliphatic dibasic acid containing from 4 to 5 carbon atoms and in which the two carbonyl groups are connected to two different carbon atoms and in which the single carbon to carbon double bond is conjugated with at least one of the carbonyl double bonds; and propylene glycol in a molal amount substantially equal to the total molal amount of both said adipic acid and said unsaturated acid.

8. A closure comprising a shell and a sealing element including a cured alkyd resin consisting of the cured condensation reaction product of from 1.5 to 2 mols of adipic acid; one mol of an unsaturated, aliphatic dibasic acid containing from 4 to 5 carbon atoms and in which the two carbonyl groups are connected to two different carbon atoms and in which the single carbon to carbon double bond is conjugated with at least one of the carbonyl double bonds; and propylene glycol in a molal amount substantially equal to the total molal amount of both said adipic acid and said unsaturated acid.

9. A closure comprising a shell and a sealing element including a cured alkyd resin consisting of the cured condensation reaction product of from 1.0 to 2.5 mols of adipic acid; one gram molecular weight of a material selected from the group consisting of maleic acid, fumaric acid, and maleic anhydride; and propylene glycol in an amount sufficient to condense with said acids and form a resinous condensation product having an average molecular weight of at least 1,000.

10. A closure comprising a shell and a sealing element including a cured alkyd resin consisting of the cured condensation reaction product of from 1.5 to 2.0 mols of adipic acid containing one gram molecular weight of a material selected from the group consisting of maleic acid, fumaric acid, and maleic anhydride; and propylene glycol in an amount sufficient to condense with said acids and form a resinous condensation product having an average molecular weight of at least 1,000.

11. A closure comprising a shell and a sealing element including a cured alkyd resin consisting of the cured condensation reaction product of from 1.0 to 2.5 mols of adipic acid; one gram molecular weight of an unsaturated acid selected from the group consisting of maleic acid, fumaric acid, and maleic anhydride; and propylene glycol in a molal amount substantially equal to the total molal amount of both said adipic acid and said unsaturated acid.

12. A closure comprising a shell and a sealing element including a cured alkyd resin consisting of the cured condensation reaction product of from 1.5 to 2.0 mols of adipic acid; one gram molecular weight of an unsaturated acid selected from the group consisting of maleic acid, fumaric acid, and maleic anhydride; and propylene glycol in a molal amount substantially equal to the total molal amount of both said adipic acid and said unsaturated acid.

13. A closure comprising a shell and a sealing element including a cured alkyd resin consisting of the cured condensation reaction product of from 1.0 to 2.5 mols of adipic acid; one mol of maleic acid; and propylene glycol in an amount sufficient to condense with said acids and form a resinous condensation product having an average molecular weight of at least 1,000.

14. A closure comprising a shell and a sealing element including a cured alkyd resin consisting of the cured condensation reaction product of from 1.5 to 2 mols of adipic acid; one mol of maleic acid; and propylene glycol in an amount sufficient to condense with said acids and form a resinous condensation product having an average molecular weight of at least 1,000.

15. A closure comprising a shell and a sealing element including a cured alkyd resin consisting of the cured condensation reaction product of about 330 parts by weight of succinic acid; about 137 parts of maleic anhydride; and propylene glycol in a molal amount substantially equal to the total molal amount of both said succinic acid and said maleic anhydride.

16. A closure comprising a shell and a sealing element including a cured alkyd resin consisting of the cured condensation reaction product of about 116 parts by weight of adipic acid; about 52 parts by weight of itaconic acid; and propylene glycol in a molal amount substantially equal to the total molal amount of both said adipic acid and said itaconic acid.

17. A closure comprising a shell and a sealing element including a binder consisting of at least 90% by weight of a cured alkyd resin and not more than 10% by weight of polystyrene, said cured alkyd resin consisting of the cured condensation reaction product of from 146 to 365 grams of a saturated, aliphatic dibasic acid containing 4 to 10 carbon atoms; one gram molecular weight of an unsaturated, aliphatic dibasic acid containing from 4 to 5 carbon atoms and in which the two carbonyl groups are connected with two different carbon atoms and in which the single carbon to carbon double bond is conjugated with at least one of the carbonyl double bonds; and propylene glycol in a molal amount substantially equal to the total molal amount of both said saturated dibasic acid and said unsaturated dibasic acid.

ELLIS GRAY KING.